April 4, 1939.   J. R. REYBURN   2,153,002
CHAIN FASTENER
Filed Aug. 27, 1936
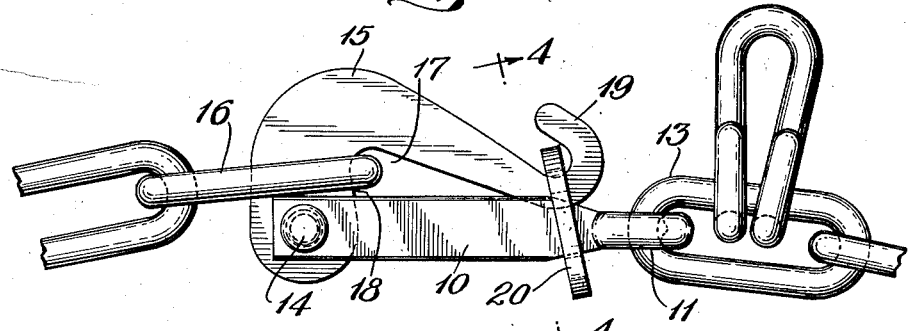
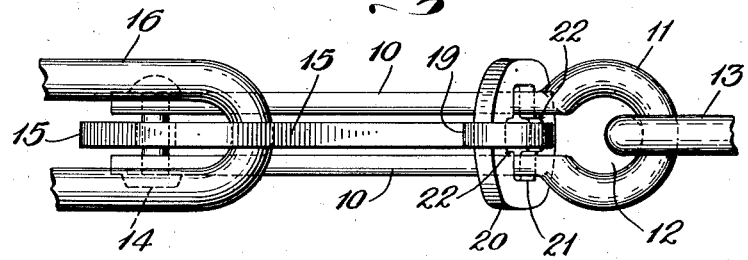
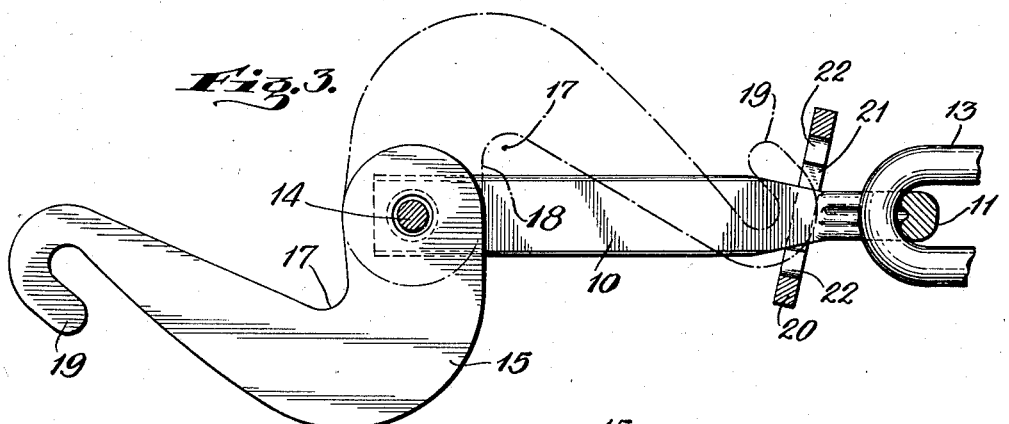
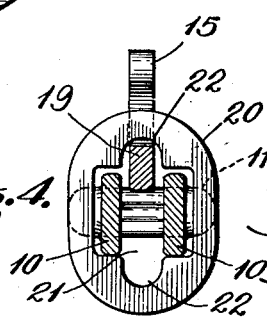
INVENTOR
JOHN R. REYBURN
BY
ATTORNEY Patented Apr. 4, 1939

2,153,002

UNITED STATES PATENT OFFICE 2,153,002

CHAIN FASTENER

John R. Reyburn, Fairfield, Conn., assignor to American Chain & Cable Company, Inc., a corporation of New York Application August 27, 1936, Serial No. 98,143

9 Claims. (Cl. 24—69)

The present invention relates to chain fasteners and more particularly to means for connecting the opposite ends of the side chains of tire chain assemblies. An object of the invention is to provide a fastener of such design and construction that it may be attached to a side chain without welding. This not only simplifies manufacture but also makes it possible to replace a broken or damaged fastener in the field.

Another object of the invention is to provide a fastener, the maximum width of which is no greater than that of the conventional side chain, so that in service it will not cause undue wear on the tire to which it is applied. Heretofore, such fasteners have commonly consisted of an elongated body link of the same stock and width as the side chain links, with a latch lever pivoted on the end of the body link, and a keeper of round wire embracing the link. Obviously, in such constructions the keeper stands out beyond the width of the side chain on either side by an amount corresponding to its wire diameter, hence, the keeper bears against the tire, displacing the same outwardly, and, in service, is apt to abraid and seriously damage the side wall of the tire. My invention overcomes this difficulty by providing a construction in which the width of the keeper is no greater than the width of the side chain links.

A more specific object of my invention is to provide a fastener in which the body link, as well as the lever, is formed of sheet metal or flat stock, thereby reducing the width of the device without sacrificing strength.

Another object of the invention is to provide an improved form of keeper which will maintain its position even when subjected to wear and strains of service. While I may use a keeper of round wire I prefer to use a keeper stamped out of sheet metal because I am able to form comparatively sharp corners in the aperture of the keeper. Heretofore, keepers have been formed of round wire, and, after being applied to the link, they have had to be bent or compressed so that the aperture therein would conform in general to the cross-sectional area of the link and latch lever passing therethrough. However, it is impossible to form sharp bends in keepers made of round wire and for this reason, in service, they are apt to wear and eventually become sufficiently loose to turn over from their normal operative position. This difficulty is overcome by my preferred form of keeper.

Other objects and advantages of my invention will appear in the following description of a preferred embodiment and thereafter the novelty and scope of the invention will be pointed out in the claims.

In the accompanying drawing:

Figure 1 is a side view of the improved fastener connecting the ends of a side chain of a tire chain assembly;

Fig. 2 is a plan view of the same on a somewhat larger scale;

Fig. 3 is a side view in longitudinal section showing the fastener in open or unlatched position; and Fig. 4 is a view in transverse section taken on the line 4—4 of Fig. 1.

The fastener comprises a body link 10 formed of sheet metal or flat stock bent to the shape of a hairpin loop. In forming this loop the closed end 11 thereof may be pressed in a dye to a round cross-section and be given a substantially circular outline to form an open eye 12 with which an end link 13 of a side chain may be interlinked. Body links may thus be stamped out of sheet metal, or they may be formed of metal strip of rectangular cross-section with portions of round cross-section interposed at predetermined intervals to form the eyes. The free ends of the hairpin loop are tied together by means of a rivet 14 and pivoted on the rivet between said ends is a latch lever 15.

The latch lever which is of angular or "elbow" shape is adapted to be passed through a link 16 at the opposite end of the side chain and then be swung on its pivot back toward the eye 12 of the body link to draw the ends of the side chain together. By reason of the elbow shape of the latch lever a re-entrant angle 17 is formed in the inner edge thereof providing a recess between the lever and the body link to receive the link 16 and permitting the latch lever to be passed between the side members of the body link to the position shown in broken lines in Figure 3. The angle 17 provides an abutment wall 18 on the lever substantially at right angles to the plane of link 16 and against which the link is seated when the lever is in the closed position shown in Fig. 1. The free end of the latch lever is formed with a hook 19 which is turned outwardly or upwardly, as viewed in Fig. 1, to engage a keeper 20 slidable on the body link.

The keeper is provided with an aperture 21 of such form and size that the keeper may slide freely upon the body link 10. This aperture is substantially rectangular, with the side walls thereof paralleling the side elements of the body link, and with end walls embracing the top and bottom edges of said elements. In each end wall there is a recess 22 so as to provide sufficient clearance for the keeper to slide freely over the hook 19 of the latch lever when the latter is in the position shown in broken lines in Fig. 3. The aperture provides ample clearance between the keeper and the side members of the body link 10 without an excessive amount of play, and since the aperture is symmetrical the keeper is reversible.

The fastener is assembled to the side chain by first hooking the hairpin loop through the chain link 13 and then passing the keeper over the body link. This done the rivet 14 is inserted through prepared openings in the free ends of the hairpin loop and through a pivotal opening in the hook 15, and is then headed in the usual manner. It will be obvious that by reason of this construction it will not be necessary to weld the body link and consequently whenever desired a fastener of this sort may be applied to a chain with but the use of a single tool, namely, a hammer to head up the rivet 14.

The operation of the device is clearly illustrated in Figs. 1 and 3. The latch lever is swung to the position shown in full lines in Fig. 3 after which it is passed through the chain link 16 and then is swung to the dotted line position shown in Fig. 3. The keeper 20 is then moved along the body link over the hook 19 and the tension of link 16 on the latch lever will draw the hooked end of the lever up to the position shown in Fig. 1.

While I have described the fastener as being provided with a keeper formed of flat stock, it will be obvious that a keeper formed of round wire could also be used, although as explained above it would be difficult if not impossible to obtain the sharp bends necessary to provide an aperture such as shown.

While I have described a preferred embodiment of my invention it will be understood that this is to be taken as illustrative and not limitative of my invention and that I reserve the right to make various changes in form, construction and arrangement of parts without departing from the spirit and scope of my invention as set forth in the claims.

I claim:

1. A chain fastener comprising a body link in the form of a hairpin loop, a rivet connecting the free ends of the loop, a latch lever pivoted between said ends on said rivet, said lever being formed with a hook at the free end thereof, and a keeper slidable on the body link and adapted to engage said hook, said keeper being stamped out of sheet metal with an aperture therein having side walls and end walls substantially paralleling the body link and with a recess in each of the end walls to clear the hook on the latch lever, said aperture being symmetrical on opposite sides so that the keeper will be reversible end for end.

2. A chain fastener for connecting opposite ends of a side chain of a tire chain assembly, said fastener comprising a body link having the form of a hairpin loop and adapted to be looped through an end link of a side chain, a rivet connecting the sides of the loop at their free ends, a latch lever shorter than the body link and pivoted between said sides on said rivet, whereby the lever may be passed through a link at the other end of the side chain and be swung back within the body link, said lever having a hook at the free end thereof, and a keeper embracing the body link with a free sliding fit and adapted to engage said hook to hold the latch lever in latched position, the overall width of the body link with the keeper thereon being no greater than the width of the links of said side chain.

3. A chain fastener for connecting opposite ends of a side chain of a tire chain assembly, said fastener comprisng a body link having the form of a hairpin loop and adapted to be linked through an end link of said side chain, the side elements of the hairpin loop being flat and disposed with their flat faces parallel and integrally connected at one end by an eye portion of round cross section extending laterally in the plane of the loop beyond the flat side elements, said eye portion having an outside diameter substantially equal to the width of the chain links, a rivet connecting the sides of the loop at their free ends, a latch lever shorter than the body link and pivoted between said sides on said rivet whereby the lever may be passed through a link at the other end of said chain and be swung back within the body link, said lever having an outwardly directed hook at the free end thereof, and a keeper having an aperture receiving the body link with a free sliding fit and adapted to engage said hook to hold the latch lever in latched position, the keeper aperture having side walls and end walls substantially paralleling the body link with a recess in at least one of the end walls to clear the hook on the latch lever, the overall width of the keeper being substantially equal to the outside diameter of said eye portion.

4. A chain fastener for connecting opposite ends of a side chain of a tire chain assembly, said fastener comprising a body having parallel side members connected at one end by a loop extending beyond the outside faces of said side members, a lever pivotally supported between the other ends of said side members for movement of its free end into the space between said side members, and a keeper provided with an opening slidably mounting said keeper on said side members and adapted to receive the free end of said lever to retain the same in securing position, the transverse dimension of said opening in said keeper being less than the external transverse dimension of said loop.

5. A chain fastener for connecting opposite ends of a side chain of a tire chain assembly, said fastener comprising a body having parallel side members connected at one end by a loop extending beyond the outside faces of said side members, a lever pivotally supported between the other ends of said side members for movement of its free end into the space between said side members adjacent said loop, and a keeper provided with an opening slidably mounting said keeper on said side members and adapted to receive the free end of said lever to retain the same in securing position, the transverse dimension of said opening in said keeper being less than the external transverse dimension of said loop, said keeper and side members being interlocked against relative rotation about an axis longitudinal of said side members.

6. A chain fastener for connecting the opposite ends of a side chain of a tire chain assembly, said fastener comprising parallel side members of rectangular cross section with their wide faces parallel to each other, a loop integrally connecting corresponding ends of said side members and having a greater external diameter than the distance between the outside faces of said side members, said loop being round in cross section, a securing lever pivoted between said side members at their other end with its free end adapted to swing into the space between said side members adjacent said loop, and a keeper having an aperture to receive said side members and the free end of said lever to retain the lever in securing position, said aperture providing for a sliding fit of said keeper on said side members and being of smaller transverse dimension than the outside transverse dimension of said loop.

7. A chain fastener for connecting the opposite ends of a side chain of a tire chain assembly, said fastener comprising parallel side members of rectangular cross section with their wide faces parallel to each other, and a loop integrally connecting corresponding ends of said side members and having a greater external diameter than the distance between the outside faces of said side members, said loop being round in cross section, a securing lever pivoted between said side members with its free end adapted to swing between said side members at a point between the pivot point of said lever and said loop, and a keeper having a rectangular aperture to receive said side members and the free end of said lever to retain the lever in securing position, said aperture providing for a non-rotatable sliding fit of said keeper on said side members and being of smaller transverse dimension than the outside transverse dimension of said loop.

8. A chain fastener for connecting the opposite ends of a side chain of a tire chain assembly, comprising a link having side members of rectangular cross section provided at one end with apertures to receive a pivot pin, a link engaging circular loop of material round cross section connecting corresponding ends of said side members, said loop having an outside diametral dimension greater than the distance between the outside faces of said side members, a lever mounted on said pivot pin for movement of its free end between said side members, and an apertured keeper slidably mounted on said side members to hold said lever in securing position, the aperture in said keeper being of shorter transverse dimension that the outside diametral dimension of said circular loop.

9. A chain fastener including a link of hairpin shape having side members which constitute the body of the link, a link engaging loop of greater transverse dimension than the body of the link connected to one of the pairs of ends of sail side members, means on the other ends for supporting a securing lever, a securing lever supported on said means for movement of its free end between said side members, and an apertured keeper slidably mounted on said body member and held against removal therefrom in one direction by said loop.

JOHN R. REYBURN.